(12) United States Patent
Song et al.

(10) Patent No.: US 11,316,218 B2
(45) Date of Patent: Apr. 26, 2022

(54) LITHIUM-AIR SECONDARY BATTERY

(71) Applicant: UNIST(ULSAN NATIONAL INSTITUTE OF SCIENCE AND TECHNOLOGY), Ulsan (KR)

(72) Inventors: Hyun-Kon Song, Ulsan (KR); Chihyun Hwang, Ulsan (KR); Jonghak Kim, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 88 days.

(21) Appl. No.: 16/862,679

(22) Filed: Apr. 30, 2020

(65) Prior Publication Data

US 2020/0350650 A1    Nov. 5, 2020

(30) Foreign Application Priority Data

May 3, 2019 (KR) .................. 10-2019-0052271
Mar. 13, 2020 (KR) .................. 10-2020-0031340

(51) Int. Cl.
| | | |
|---|---|---|
| *H01M 12/02* | (2006.01) | |
| *H01M 12/08* | (2006.01) | |
| *H01M 10/0567* | (2010.01) | |
| *H01M 4/38* | (2006.01) | |

(52) U.S. Cl.
CPC ........... *H01M 12/02* (2013.01); *H01M 4/382* (2013.01); *H01M 12/08* (2013.01)

(58) Field of Classification Search
CPC ............................ H01M 12/00; H01M 10/056
See application file for complete search history.

(56) References Cited

U.S. PATENT DOCUMENTS

| | | | | |
|---|---|---|---|---|
| 2011/0070505 A1* | 3/2011 | Takechi | ............... | H01M 12/08 |
| | | | | 429/402 |
| 2012/0141889 A1* | 6/2012 | Lee | ....................... | H01M 12/06 |
| | | | | 429/405 |

FOREIGN PATENT DOCUMENTS

| | | |
|---|---|---|
| KR | 10-2016-0034516 | 3/2016 |
| KR | 10-2016-0099133 | 8/2016 |
| KR | 10-2017-0107345 | 9/2017 |
| KR | 10-2018-0027260 | 3/2018 |

OTHER PUBLICATIONS

Jonghak Kim et al., "A Chemically and Electrochemically Bifunctional Mobile Catalyst for Anti-aging Lithium-Oxygen Batteries", UNIST (PowerPoint presentation).
Benjamin J et al., "TEMPO: A Mobile Catalyst for Rechargeable Li—O2 Batteries", Journal of the American Chemical Society, Sep. 25, 2014.
Qi Dong et al., "Catalysts in metal-air batteries", MRS Communications, 8(02), 372-386.
Eda Yilmaz et al., "Promoting Formation of Noncrystalline Li2O2 in the Li—O2 Battery with RuO2 Nanoparticles", Nano Lett., 2013, 13 (10), pp. 4679_4684.
Ines Batinic-Haberle et al., "Superoxide dismutase mimics and other redox-active therapeutics", 2016, John Wiley & Sons.

(Continued)

*Primary Examiner* — James Lee
(74) *Attorney, Agent, or Firm* — Lex IP Meister, PLLC

(57) ABSTRACT

Provided is a lithium-air secondary battery including: an air electrode (air cathode); a lithium anode (Li anode); and an electrolyte including a superoxide dismutase mimic catalyst (SODm).

7 Claims, 7 Drawing Sheets

(56) References Cited

OTHER PUBLICATIONS

Chihyun Hwang et al., "Biomimetic Superoxide Disproportionation Catalyst for Anti-Aging Lithium-Oxygen Batteries", ACS Nano 2019, 13, 8, 9190-9197, Jun. 18, 2019. DOI: 10.1021/acsnano.9b03525.

Jung-Gu Han et al., "An Antiaging Electrolyte Additive for High-Energy-Density Lithium-Ion Batteries", Adv. Energy Mater. 2020, 2000563, Apr. 6, 2020. DOI: 10.1002/aenm.202000563.

* cited by examiner

LITHIUM-AIR SECONDARY BATTERY

This application claims priority to and the benefit of Korean Patent Application No. 10-2019-0052271 filed in the Korean Intellectual Property Office on May 3, 2019 and Korean Patent Application No. 10-2020-0031340 filed in the Korean Intellectual Property Office on Mar. 13, 2020, the entire contents of which are incorporated herein by reference.

BACKGROUND OF THE INVENTION

(a) Field of the Invention

This relates to lithium-air secondary battery.

(b) Description of the Related Art

Currently, various types of next-generation secondary battery systems are being researched, and among them, lithium-air secondary batteries may be capable of realizing the highest capacity. Since the lithium-air secondary battery uses light air (oxygen) as a cathode active material, it has an advantage of realizing a high capacity of several times that of a lithium ion secondary battery using a heavy transition metal oxide.

In the lithium-air secondary battery, lithium ions move from a lithium metal that is an anode through an organic electrolyte to an air electrode (cathode) in a discharging process, and in the air electrode, oxygen in the air and lithium ions react to form $Li_2O_2$ (lithium peroxide). Herein, the formed $Li_2O_2$ is a solid so that it covers the surface of the air electrode. In a charging process, $Li_2O_2$ formed in the discharge process is decomposed into lithium ions and oxygen again. Theoretically, pure $Li_2O_2$ alone should be formed during the discharge and be completely decomposed during the charge, but many side-reaction products in addition to the $Li_2O_2$ are formed during the discharge and are not sufficiently decomposed during the charge but are accumulated on the air electrode, and the accumulated side-reaction products bring about a sharp capacity decrease as charges and discharges proceed.

Accordingly, the lithium-air secondary battery cell has a drawback of a very deteriorated cycle-life compared with currently commercially-available secondary battery systems. In addition, since a high overvoltage is applied thereto due to additional energy for decomposing the reaction products such as $Li_2O_2$ having almost no electrical conductivity and the like, much more energy is required during the charge than the energy obtained during the discharge, which causes an efficiency decrease problem.

SUMMARY OF THE INVENTION

The present invention provides a lithium-air secondary battery having improved charge and discharge characteristics by suppressing the formation of side-reaction products during discharge.

An embodiment of the present invention provides a lithium-air secondary battery including an air electrode (air cathode), a lithium anode (Li anode), and an electrolyte including a superoxide dismutase mimic catalyst (SODm).

The superoxide dismutase mimic catalyst may perform a disproportionation reaction of a superoxide ($O_2^-$) generated at the air electrode during discharge, and may convert it into oxygen ($O_2^-$) and $Li_2O_2$.

The superoxide dismutase mimic catalyst may serve to suppress side reactions of the superoxide ($O_2^-$) generated at the air electrode during discharge.

The side reaction may include a reaction to form a lithium salt other than the $Li_2O_2$.

The lithium salt other than the $Li_2O_2$ may be at least one selected from $Li_2CO_3$, LiOH, $LiCOOCH_3$, and LiCOOR (R is alkyl).

The superoxide dismutase mimic catalyst (SODm) may be at least one of an organic compound, a free radical compound, a metal complex, and a metal oxide which includes at least one functional group of a carboxyl group, a polyphenol group, and a hydroxyl group.

The SODm (superoxide dismutase mimic catalyst) may be, for example, at least one of MA-$C_{60}$, 4-carboxy-TEMPO, honokiol, $CeO_2$, $OsO_4$, Mn texaphyrin, MnTrM-2-Corrole$^{3+}$, $[MnBV^{2-}]_2$, $[MnBVDME]_2$, $[MnMBVDME]_2$, and $[MnBVDT^{2-}]_2$.

A concentration of the SODm (superoxide dismutase mimic catalyst) may be 0.1 mM to 100 mM based on the electrolyte.

By suppressing the formation of side-reaction products during discharge, a high-capacity lithium-air secondary battery having improved charge/discharge characteristics may be realized.

DETAILED DESCRIPTION OF THE EMBODIMENTS

Figure 1:
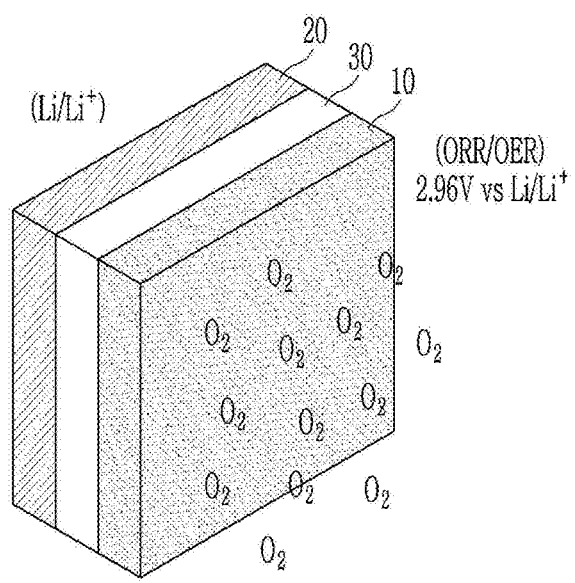
FIG. 1 is a view showing a lithium-air secondary battery according to an embodiment of the present invention.

Hereinafter, embodiments of the present invention are described in detail. However, these embodiments are exemplary, the present invention is not limited thereto, and the present invention is defined by the scope of claims.

The same reference numerals shown in each drawing denote the same members.

Throughout the specification, when one member is disposed "on" another member, this includes not only the case where one member contacts another member, but also the case where another member is present between the two members.

Throughout the specification, when a portion "includes" a certain element, this means that other elements may be further included instead of excluding other elements.

Hereinafter, a lithium-air secondary battery according to an embodiment will be described with reference to FIG. 1.

FIG. 1 is a view showing a lithium-air secondary battery according to an embodiment of the present invention.

Referring to FIG. 1, a lithium-air secondary battery according to an embodiment of the present invention includes an air electrode 10, a lithium anode 20, and an electrolyte 30.

In an embodiment, the electrolyte 30 includes a superoxide dismutase mimic catalyst (SODm).

The superoxide dismutase (SOD) is an enzyme that prevents cells from being damaged by a superoxide, which is the most common free radical in the human body, and among these SODs, species applied to the electrolyte for batteries to function as a catalyst are defined as a superoxide dismutase mimic catalyst (SODm). Hereinafter, it is abbreviated as SODm.

The SODm may be applied to an electrolyte for a battery to improve various problems generated by the superoxide, which is a free radical generated from the battery. For example, the lithium-air secondary battery according to the present invention includes the electrolyte including the SODm and thus suppresses formation of side-reaction products during the discharge, resultantly realizing a lithium-air secondary battery having improved charge and discharge characteristics.

A concentration of the SODm may be from 0.1 mM to 100 mM based on the electrolyte.

When the concentration of the SODm is within the above range, discharge capacity and charge-discharge cycle life may be improved.

According to one aspect, the SODm may serve to act as a catalyst for a disproportionation reaction of the superoxide ($O_2^-$) generated at the air electrode during discharge, and may convert it into oxygen ($O_2^-$) and $Li_2O_2$.

That is, the SODm may serve to suppress the side reaction of the superoxide by promoting the disproportionation reaction of the superoxide generated in the air electrode.

Figure 2:
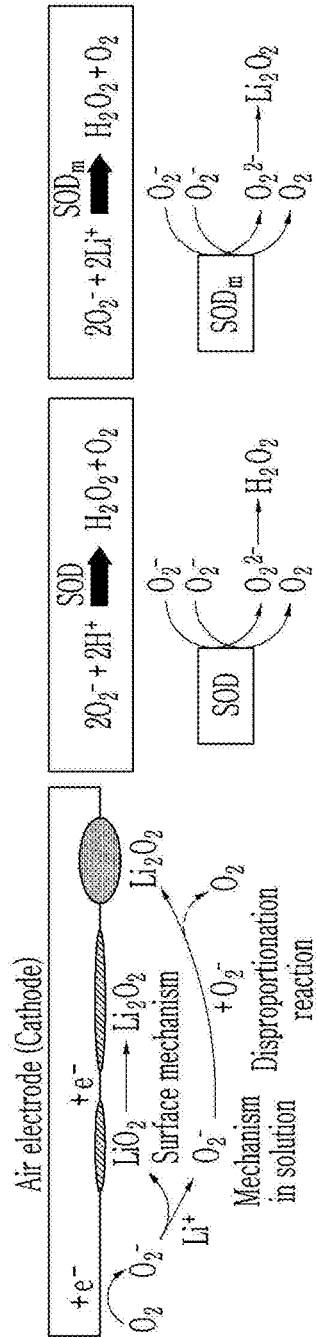
FIG. 2 is a view for explaining a mechanism for discharging a lithium-air secondary battery according to an embodiment of the present invention.

FIG. 2 is a view for explaining a mechanism for discharging a lithium-air secondary battery according to an embodiment of the present invention.

Referring to FIG. 2, a mechanism of the lithium-air secondary battery according to an embodiment of the present invention during the discharge may be classified into 1) a surface mechanism and 2) a solution mechanism.

First, the surface mechanism is a process in which the superoxide ($O_2^-$) generated from the air electrode during the discharge of the lithium-air secondary battery reacts with lithium ions and thus forms $LiO_2$ and $Li_2O_2$. Herein, the formed $Li_2O_2$ is a solid so that it covers the surface of the air electrode.

However, the superoxide ($O_2^-$) not reacting with the lithium ions during this discharge forms different side-reaction products therefrom, and the reaction products are accumulated as charges and discharges proceed and thus cause a sharp capacity decrease.

In order to solve this problem, the solution mechanism is additionally introduced through the electrolyte including the SODm in the present invention. During the discharge, the superoxide ($O_2^-$) not reacting with the lithium ions is disproportionally reacted through the SODm and converted into oxygen and $Li_2O_2$, and herein, the generated $Li_2O_2$ is formed on the surface of the air electrode. In other words, the SODm plays a role of being a catalyst for converting the superoxide generated from the air electrode into $Li_2O_2$.

During the charge, the $Li_2O_2$ formed through the surface mechanism and the solution mechanism during the discharge is decomposed into lithium ions and oxygen, and in the lithium-air battery according to the present invention, since the side-reaction products are not formed during the discharge, charge and discharge characteristics may be further improved.

Figure 3:
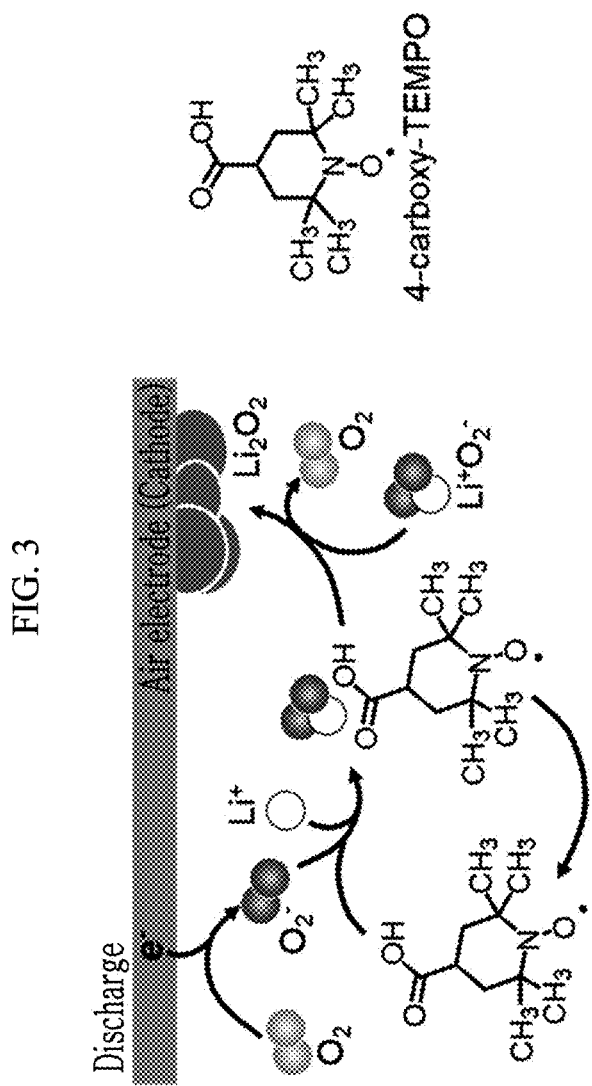
FIG. 3 is a view for explaining the action of the SODm during charge and discharge of the lithium-air secondary battery according to an embodiment of the present invention.

FIG. 3 is a view for explaining the action of the SODm during charge and discharge of the lithium-air secondary battery according to an embodiment of the present invention. In more detail, when an electrolyte including 4-carboxy-TEMPO is applied to a lithium-air battery, it is a view for explaining an action of the 4-carboxy-TEMPO during discharge.

Referring to FIG. 3, the 4-carboxy-TEMPO reacts with the superoxide ($O_2^-$) generated at the air electrode during discharge, and serves to promote formation of $Li_2O_2$ in the electrolyte.

According to one aspect, the SODm may serve to suppress side reactions that form a lithium salt other than $Li_2O_2$ during discharge.

Specifically, the SODm may serve to inhibit production of at least one side-reaction product selected from $Li_2CO_3$, LiOH, $LiCOOCH_3$, and LiCOOR (R is alkyl). However, the present invention is not limited thereto, and any side-reaction product that may be caused by the superoxide may be suppressed by SODm.

Figure 5:
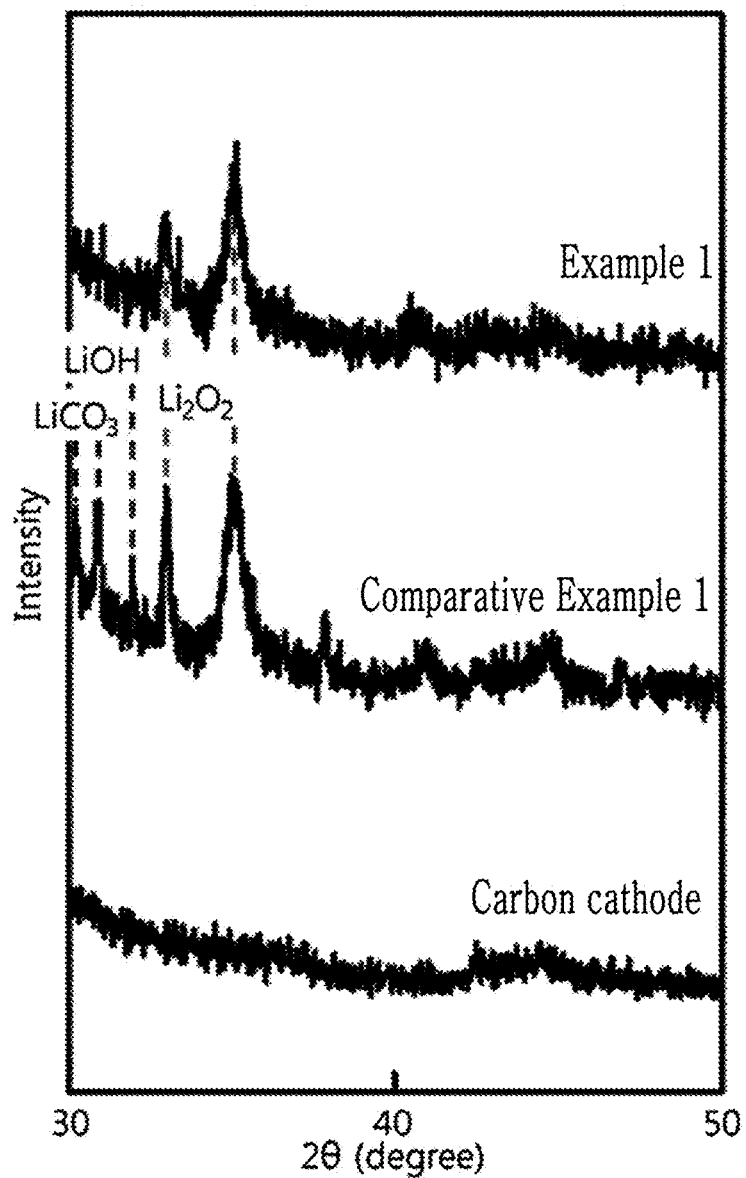
FIG. 5 is an XRD graph of a lithium-air battery cell of an example according to the present invention and a lithium-air battery cell of a comparative example.

In this regard, in the lithium-air secondary battery to which the electrolyte including SODm is applied according to an embodiment, side reactions are limited, and generation of by-products such as $Li_2CO_3$, LiOH, $LiCOOCH_3$, and LiCOOR (R is alkyl) is also inhibited as shown in FIG. 5.

FIG. 5 is an XRD graph of the lithium-air battery cell of the example according to the present invention and the lithium-air battery cell of the comparative example.

Referring to FIG. 5, comparing the lithium-air battery including no SODm according to Comparative Example 1 with the lithium-air battery of Example 1 produced by applying an electrolyte including MA-$C_{60}$, which is one type of SODm according to an embodiment of the present invention, an amount of the side-reaction products such as $LiCO_3$, LiOH, and the like is greatly decreased. The reason is that MA-$C_{60}$ plays a role of suppressing formation of the side-reaction products such as $Li_2CO_3$, LiOH, and the like during the discharge.

As aforementioned, since the lithium-air secondary battery of the present invention uses the electrolyte including SODm, the side-reaction products are not formed during the discharge, and thus charge and discharge characteristics thereof are improved.

Figure 4:
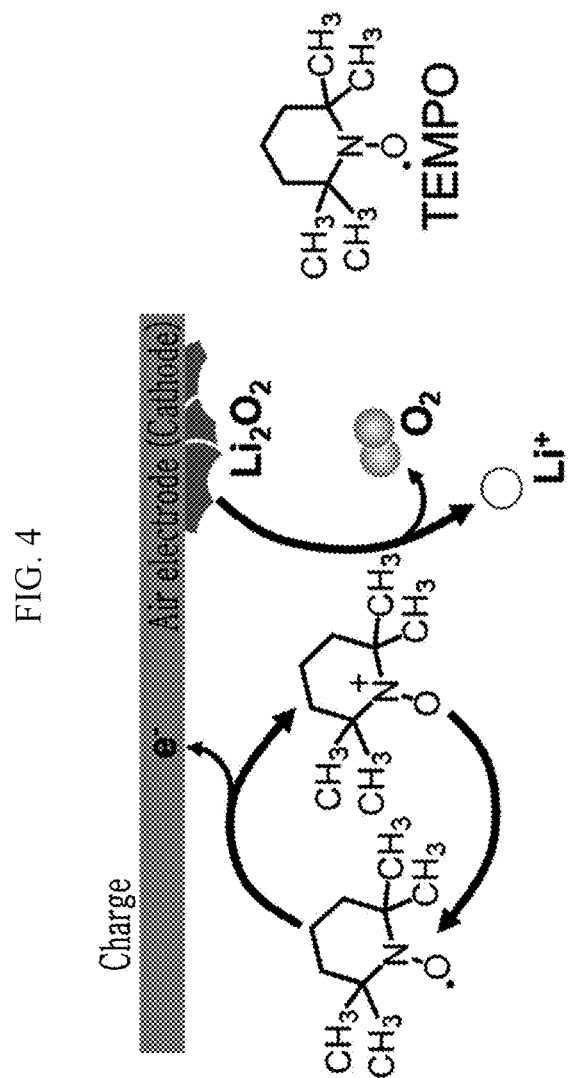
FIG. 4 is a comparison view for explaining the action of a redox-mediated additive during charge and discharge of the lithium-air secondary battery cell according to the comparative example.

On the other hand, a comparison view for explaining an action of the redox-mediated additive in contrast to this is shown in FIG. 4.

FIG. 4 is a comparison view for explaining an action of the redox-mediated additive charge and discharge of the lithium-air secondary battery cell according to the comparative example. In more detail, when an electrolyte including TEMPO, which is a type of redox-mediated additive, is applied to a lithium-air battery, it is a view for explaining an action of the TEMPO during charge.

Referring to FIG. 4, TEMPO, which is a redox-mediated additive, plays a role of promoting decomposition of $Li_2O_2$ into lithium ions ($Li^+$) and oxygen $O_2$, while it transfers electrons to the air electrode and is oxidized itself, and then receives the electrons again from $Li_2O_2$ and is reduced itself during the charge.

According to one aspect, the redox-mediated additive plays a role of promoting a redox reaction and thus allowing the battery have a low charge voltage during the charge. This means that charge and discharge characteristics are improved due to the decomposition promotion of $Li_2O_2$, which is a discharge product. In other words, the redox-mediated additive does not react with the superoxide unlike the SODm and thus plays a different redox-mediated additive role from that of the SODm.

Specifically, the electrolyte of the lithium-air secondary battery includes the SODm and thus may control a side reaction of the superoxide, which is a free radical generated from the air electrode of the lithium-air secondary battery, and suppress formation of the side-reaction products during the discharge, and resultantly, realize a lithium-air secondary battery having improved charge and discharge characteristics.

According to one aspect, the superoxide dismutase mimic catalyst (SODm) applied to the electrolyte of the lithium-air secondary battery may be at least one of an organic compound including at least one functional group of a carboxyl group, a polyphenol group, and a hydroxyl group; a free radical compound including at least one functional group of a carboxyl group, a polyphenol group, and a hydroxyl group; a metal complex including at least one functional group of a carboxyl group, a polyphenol group, and a hydroxyl group; and a metal oxide including at least one functional group of a carboxyl group, a polyphenol group, and a hydroxyl group.

According to a specific aspect, the SODm applied to the electrolyte of the lithium-air secondary battery may include at least one selected from MA-$C_{60}$, 4-carboxy-TEMPO, honokiol, $CeO_2$, $OsO_4$, Mn texaphyrin, MnTrM-2-Corrole$^{3+}$, [MnBV$^{2-}$]$_2$, [MnBVDME]$_2$, [MnMBVDME]$_2$, and [MnBVDT$^{2-}$]$^2$.

The SODm includes a plenty of conventionally reported materials, but there are still many materials not yet reported. Accordingly, the SODm applied to the electrolyte of the lithium-air secondary battery is not limited to the ones listed above but selected from those applicable as a superoxide dismutase mimic catalyst (SODm).

In particular, among each conventionally known SODm, any material having an electrochemical redox potential within a range of −450 mV to −50 mV compared to that of a standard hydrogen electrode or being stable within an operation voltage range of the lithium air battery of 2.0 V to 4.5 V (vs. a Li$^+$/Li potential) may be applied to a lithium-air secondary battery without a particular limit.

The air electrode 10 may use oxygen ($O_2^-$) as a cathode active material. For this, the cathode 10 may be formed of a porous conductive material. For example, the cathode 10 may include at least one of a carbon-based material (e.g., carbon black, carbon nanotubes, graphene, carbon fiber, etc.), a metal powder, or a conductive polymer material.

The lithium anode 20 may include lithium (Li). The lithium anode 20 may include a lithium metal or an alloy of lithium and other metals. For example, the lithium anode 20 may include an alloy of silicon (Si), aluminum (Al), tin (Sn), magnesium (Mg), indium (In), vanadium (V), and the like, and lithium.

The electrolyte 30 may be an aqueous electrolyte or a non-aqueous electrolyte. The non-aqueous electrolyte may include an organic solvent that does not contain water. The non-aqueous organic solvent may include a carbonate-based solvent, an ester-based solvent, an ether-based solvent, a ketone-based solvent, an organosulfur-based solvent, an organophosphorus-based solvent, or an aprotic solvent.

The carbonate-based solvent may include dimethyl carbonate (DMC), diethyl carbonate (DEC), ethyl methyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), fluoroethylene carbonate (FEC), butylene carbonate (BC), and the like, and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone and the like. In addition, the organosulfur-based solvent and the organophosphorus-based solvent based solvent may include methanesulfonyl chloride, p-trichloro-n-dichlorophosphoryl monophosphazene, and the like, and the aprotic solvent may include nitriles such as R—CN (R is a C2 to C20 linear, branched, or cyclic hydrocarbon group, and may include a double bond, an aromatic ring, or an ether bond), and the like, amides such as dimethyl formamide and the like, dioxolanes such as 1,3-dioxolane and the like, and sulfolanes and the like.

The non-aqueous organic solvent may be used alone or in a mixture. When the organic solvent is used in a mixture, the mixture ratio may be controlled in accordance with a desirable battery performance.

The non-aqueous organic solvent may include a lithium salt, and the lithium salt dissolved in an organic solvent may act as a source of lithium ions in a battery and may, for example, play a role in promoting movement of lithium ions between the anode and the electrolyte 30. The lithium salt may include one or two or more selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiI, $LiB(C_2O_4)_2$ (lithium bis(oxalato) borate, LiBOB), and $LiN(CF_3SO_2)_2$ (lithium bis(trifluoromethylsulfonyl) imide, LiTFSI). The lithium salt may be used at a concentration range of 0.1 M to 2.0 M. When the concentration of the lithium salt is included in the above range, the electrolyte may exhibit excellent electrolyte performance since the electrolyte has appropriate conductivity and viscosity, and lithium ions may be effectively moved. The non-aqueous organic solvent may further include other metal salts in addition to the lithium salt, such as $AlCl_3$, $MgCl_2$, NaCl, KCl, NaBr, KBr, $CaCl_2$), and the like.

The lithium-air secondary battery may further include a catalyst as needed. The catalyst may be a redox catalyst of oxygen, it may be supported on the porous carbon structure of the cathode of the lithium-air secondary battery, and it may serve to help the redox of the cathode active material, oxygen ($O_2^-$). The catalyst may be, for example, manganese dioxide ($MnO_2$), cerium dioxide ($CeO_2$), platinum (Pt), gold (Au), silver (Ag), ferric trioxide ($Fe_2O_3$), nickel monoxide (NiO), copper oxide (CuO), tricobalt tetraoxide ($Co_3O_4$), or a combination thereof.

In the present specification, the term "air" is not limited to atmospheric air, and may include a combination of oxygen-containing gases, or pure oxygen gas. The broad definition of this term "air" may be applied to all uses, for example air batteries, air cathodes, and the like.

A shape of the lithium-air secondary battery is not particularly limited, and may be, for example, coin, button, sheet, stacked, cylindrical, flat, horned, and the like. It may also be applied to large-sized batteries used in electric vehicles and the like.

Hereinafter, the present invention will be described in more detail through examples and comparative examples.

However, the following examples are only for illustrating the present invention, and the content of the present invention is not limited to the following examples.

Production of Lithium-air Secondary Battery Cell

Example 1

Initial charge and discharge characteristics of a cell produced by adding 1 mM of MA-$C_{60}$ as an additive to tetraethylene glycol dimethyl ether (TEGDME) including 1 M LiTFSi as a lithium salt are shown in FIG. 2.

For an air electrode, carbon paper was used, for an anode, a lithium metal thin film was used, and for a separator disposed on the air electrode, a glass microfiber filter (GF/D, Whatman) was used.

MA-$C_{60}$ means fullerene functionalized with malonic acid.

Example 2

A lithium-air secondary battery cell was produced according to the same method as Example 1, except that 4-carboxy-TEMPO (4-carboxy-2,2,6,6-tetramethylpiperidinyloxy) was used instead of the MA-$C_{60}$ to prepare an electrolyte.

Example 3

A lithium-air secondary battery cell was produced according to the same method as Example 1, except that honokiol was used instead of the MA-$C_{60}$ to prepare an electrolyte.

Comparative Example 1

A lithium-air secondary battery cell was produced according to the same method as Example 1, except that the additive was not used.

Comparative Example 2

A lithium-air secondary battery cell was produced according to the same method as Example 1, except that TEMPO, which is a redox-mediated additive, was used instead of the MA-$C_{60}$ to prepare an electrolyte.

Evaluation 1: Evaluation of Cycle-life Characteristics

Figure 6:
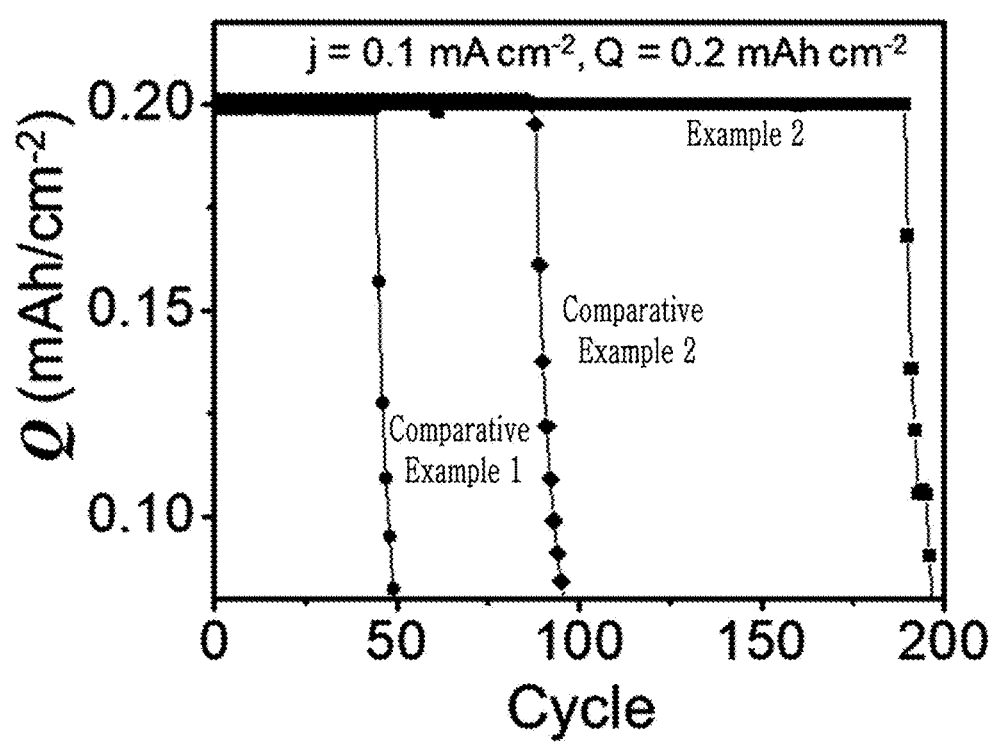
FIG. 6 is a graph for comparing cycle characteristics of the lithium-air battery cell of the example according to the present invention and the lithium-air battery cell of the comparative example.

The cycle characteristics of the lithium-air secondary battery cells according to Example 2 and Comparative Examples 1 and 2 were evaluated, and the results are shown in FIG. 6.

The current density during the measurement was 0.1 mAcm$^{-2}$, and was limited to a capacity of 0.2 mAcm$^{-2}$.

The lithium-air secondary battery cells according to Example 2 and Comparative Examples 1 and 2 were discharged at a constant current of 0.1 mAcm$^{-2}$ to a lower limit voltage of 2 V for 2 hours at room temperature (25° C.) and charged at a constant current of 0.1 mAcm$^{-2}$ to an upper limit voltage of 4.5 V for 2 hours, which was counted as one cycle, and capacity of the cells at each cycle are shown in FIG. 6.

FIG. 6 is a graph for comparing the cycle characteristics of the lithium-air battery cell of the example according to the present invention and the lithium-air battery cell of the comparative example.

Referring to FIG. 6, compared with the lithium-air battery cell including no additive according to Comparative Example 1 and the lithium air secondary battery cell including TEMPO as a redox-mediated additive as the additive according to Comparative Example 2, the lithium-air battery cell produced by applying an electrolyte including 4-carboxy-TEMPO, which is one embodiment of SODm, according to Example 2, exhibited greatly improved cycle-life characteristics. In particular, TEMPO used in Comparative Example 2 played a role of promoting oxidization-reduction but not a reaction of a superoxide and thus exhibited not much improved cycle-life characteristics compared with the cell using 4-carboxy-TEMPO according to an embodiment.

In other words, the lithium-air battery cell produced by applying an electrolyte including 4-carboxy-TEMPO, as one type of SODm, had no formation of side-reaction products by the 4-carboxy-TEMPO and thus exhibited improved charge and discharge characteristics compared with the cell including no additive.

In addition, the lithium-air secondary battery cell produced by an electrolyte including SODm may have high discharge capacity, compared with a lithium-air secondary battery cell produced by applying an electrolyte including a redox-mediated additive, and in addition, since a solution mechanism dominantly works during the discharge, the lithium-air secondary battery cell produced by an electrolyte including SODm may exhibit an additional increase effect.

Evaluation 2: Evaluation of Discharge Capacity

Figure 7:
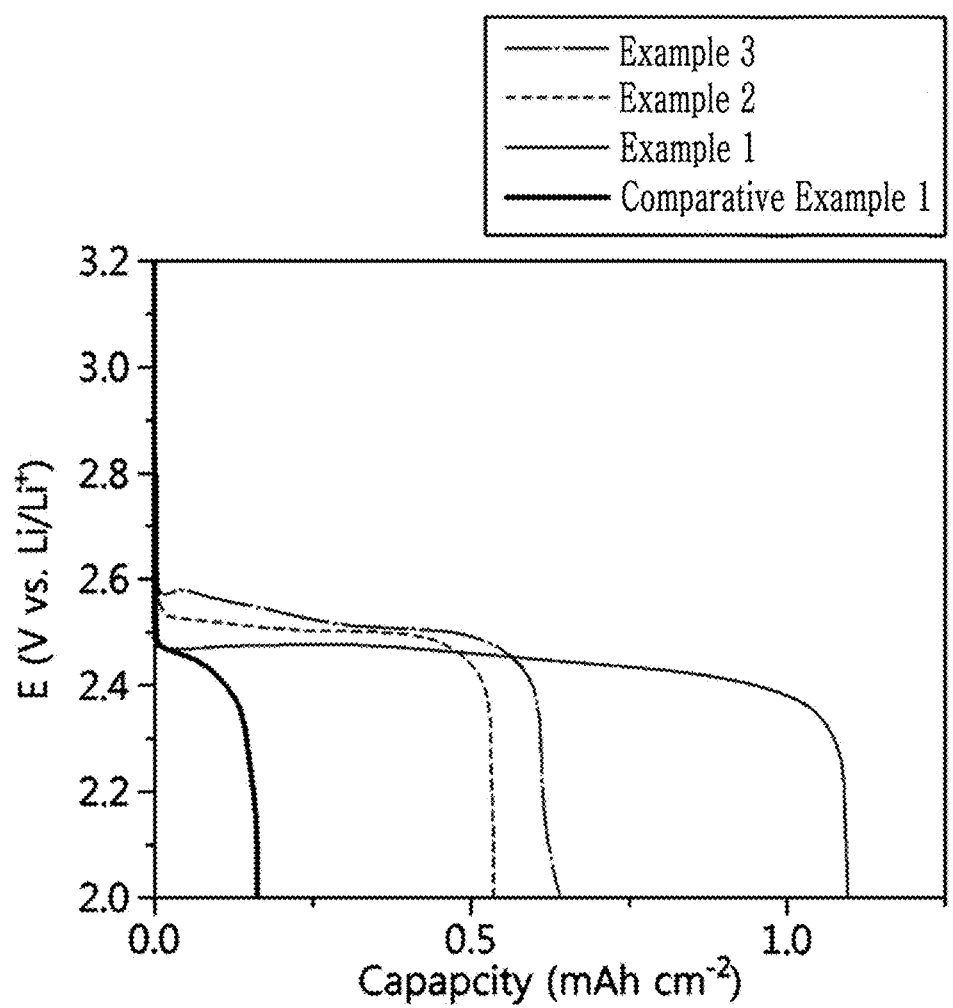
FIG. 7 is a graph showing an initial charge-discharge curve of the lithium-air battery cell of the example according to the present invention and a lithium-air battery cell of the comparative example.

The discharge capacities of the lithium-air secondary battery cells produced according to Examples 1 to 3 and Comparative Example 1 were measured, and the results are shown in FIG. 7.

Discharge conditions were set to be a lower voltage of 2.0 V with a current density of 0.2 mAcm$^{-2}$.

FIG. 7 is a graph showing an initial charge-discharge curve of the lithium-air battery cell of the examples according to the present invention and a lithium-air battery cell of the comparative example.

Referring to FIG. 7, Comparative Example 1 exhibited discharge capacity of about 0.23 mAhcm$^{-2}$, but Example 1 exhibited discharge capacity of about 1.20 mAhcm$^{-2}$, Example 2 exhibited discharge capacity of about 0.5 mAhcm$^{-2}$, and Example 3 exhibited discharge capacity of about 0.7 mAhcm$^{-2}$. Accordingly, the lithium-air secondary battery cell according to an embodiment includes SODm as an additive, thus it suppresses formation of side-reaction products during the discharge and efficiently forms $Li_2O_2$, and resultantly, realizes improved discharge capacity.

Although the preferred embodiments of the present invention have been described through the above, the present invention is not limited thereto, and can be implemented by various modifications within the scope of the claims and detailed description of the invention and the accompanying drawings, which also fall within the scope of the present invention.

What is claimed is:

1. A lithium-air secondary battery, comprising:
   an air electrode;
   a lithium anode; and
   an electrolyte comprising a superoxide dismutase mimic catalyst (SODm),
   wherein the superoxide dismutase mimic catalyst (SODm) comprises: at least one of an organic compound comprising at least one functional group of a carboxyl group, a polyphenol group, and a hydroxyl group; a free radical compound comprising at least one functional group of a carboxyl group, a polyphenol group, and a hydroxyl group; a metal complex comprising at least one functional group of a carboxyl group, a polyphenol group, and a hydroxyl group; and a metal oxide comprising at least one functional group of a carboxyl group, a polyphenol group, and a hydroxyl group.

2. The lithium-air secondary battery of claim 1, wherein the superoxide dismutase mimic catalyst (SODm) performs a disproportionation reaction of a superoxide ($O_2^-$) generated at the air electrode during discharge and converts the superoxide into oxygen ($O_2$) and $Li_2O_2$.

3. The lithium-air secondary battery of claim 2, wherein the superoxide dismutase mimic catalyst serves to suppress side reactions of the superoxide ($O_2^-$) generated at the air electrode during discharge.

4. The lithium-air secondary battery of claim 3, wherein the side reaction comprises a reaction to form a lithium salt other than the $Li_2O_2$.

5. The lithium-air secondary battery of claim 4, wherein the lithium salt other than the $Li_2O_2$ is at least one selected from $Li_2CO_3$, LiOH, $LiCOOCH_3$, and LiCOOR (R is alkyl).

6. The lithium-air secondary battery of claim 1, wherein the superoxide dismutase mimic catalyst (SODm) comprises at least one selected from MA-$C_{60}$, 4-carboxy-TEMPO, honokiol, $CeO_2$, $OsO_4$, Mn texaphyrin, MnTrM-2-Corrole$^{3+}$, [MnBV$^{2-}$]$_2$, [MnBVDME]$_2$, [MnMBVDME]$_2$, and [MnBVDT$^{2-}$]$_2$.

7. The lithium-air secondary battery of claim 1, wherein a concentration of the SODm (superoxide dismutase mimic catalyst) is 0.1 mM to 100 mM based on the electrolyte.

\* \* \* \* \*